(12) United States Patent
Garcia et al.

(10) Patent No.: US 8,056,631 B2
(45) Date of Patent: Nov. 15, 2011

(54) CEMENTITIOUS COMPOSITIONS HAVING COARSE GROUND BLAST FURNACE SLAG AND METHODS OF MAKING AND USING THE SAME

(75) Inventors: Jose Garcia, San Antonio, TX (US); Louis U. Spellman, Lakeway, TX (US)

(73) Assignee: Capitol Aggregates, Ltd., San Antonio, TX (US)

( * ) Notice: Subject to any disclaimer, the term of this patent is extended or adjusted under 35 U.S.C. 154(b) by 0 days.

(21) Appl. No.: 12/357,256

(22) Filed: Jan. 21, 2009

(65) Prior Publication Data

US 2010/0180538 A1    Jul. 22, 2010

(51) Int. Cl.
*E21B 33/14* (2006.01)
*C04B 7/02* (2006.01)
*C04B 7/14* (2006.01)
*C04B 28/08* (2006.01)

(52) U.S. Cl. .................... 166/293; 106/602; 106/789

(58) Field of Classification Search .......................... None
See application file for complete search history.

(56) References Cited

U.S. PATENT DOCUMENTS

| | | | |
|---|---|---|---|
| 4,223,733 A * | 9/1980 | Bodor et al. ................. 166/293 |
| 4,761,183 A | 8/1988 | Clarke | |
| 5,026,215 A | 6/1991 | Clarke | |
| 5,049,288 A | 9/1991 | Brothers et al. | |
| 5,071,484 A | 12/1991 | Bonifay et al. | |
| 5,086,850 A | 2/1992 | Harris et al. | |
| 5,121,795 A | 6/1992 | Ewert et al. | |
| 5,123,487 A | 6/1992 | Harris et al. | |
| 5,125,455 A | 6/1992 | Harris et al. | |
| 5,127,473 A | 7/1992 | Harris et al. | |
| 5,181,568 A | 1/1993 | McKown et al. | |
| 5,238,064 A | 8/1993 | Dahl et al. | |
| 5,284,513 A | 2/1994 | Cowan et al. | |
| 5,311,944 A * | 5/1994 | Cowan et al. ................. 166/292 |
| 5,340,397 A | 8/1994 | Brothers | |
| 5,547,024 A * | 8/1996 | Di Lullo Arias .............. 166/292 |
| 5,578,122 A | 11/1996 | Carrasquillo | |
| 5,658,624 A | 8/1997 | Anderson et al. | |
| 5,976,243 A * | 11/1999 | Oates et al. .................... 106/767 |
| 6,113,684 A | 9/2000 | Kunbargi | |
| 6,273,191 B1 | 8/2001 | Reddy et al. | |
| 6,336,505 B1 | 1/2002 | Reddy | |
| 6,406,534 B1 | 6/2002 | Kunbargi | |
| 6,454,004 B2 | 9/2002 | Reddy et al. | |
| 6,630,021 B2 | 10/2003 | Reddy et al. | |
| 6,758,896 B2 | 7/2004 | Kunbargi | |
| 6,793,730 B2 | 9/2004 | Reddy et al. | |
| 2006/0230986 A1 * | 10/2006 | Hoffis ............................ 106/791 |
| 2007/0186820 A1 * | 8/2007 | O'Hearn ....................... 106/789 |

FOREIGN PATENT DOCUMENTS

EP    2080742 A2 * 7/2009
GB    2387593 A  * 10/2003

OTHER PUBLICATIONS

Bentz et al. "Early-Age Properties of Cement-Based Materials. I: Influence of Cement Fineness" Journal of Materials in Civil Engineering, 502, (Jul. 2008), 502-508 (7 page).
Labarca et al. "Effects of Ground Granulated Blast Furnace Slag in Portland Cement Concrete—Expanded Study" (available at http://on.dot.wi.gov/wisdotresearch/database/reports/05-01slagexpanded-fr.pdf) (Jun. 2007), (89 Pages).

* cited by examiner

*Primary Examiner* — Zakiya W Bates
(74) *Attorney, Agent, or Firm* — Cox Smith Matthews Incorporated (57) ABSTRACT

A cementitious composition capable of forming a high, early-phase strength cement may comprise construction grade cement and ground blast furnace slag, the ground blast furnace slag having a Blaine fineness less than about 250 $m^2$/kg. The cementitious composition may comprise, for each 100% by weight, greater than about 50% by weight construction grade portland cement and less than about 50% by weight ground blast furnace slag, and the cementitious composition may have a Blaine fineness less than about 300 $m^2$/kg. Methods of making and using such a cementitious composition to cement a structure are also described.

9 Claims, 4 Drawing Sheets

CEMENTITIOUS COMPOSITIONS HAVING COARSE GROUND BLAST FURNACE SLAG AND METHODS OF MAKING AND USING THE SAME

FIELD

This application relates generally to cementitious compositions and methods of making and using such compositions.

BACKGROUND

Cementitious compositions are used in a number of applications which demand materials that function over a wide range of environmental conditions. As one example, cementitious compositions are commonly used to seal wellbores in oil and gas drilling. A composition selected for this application supports the casing of the well and provides zonal isolation in the annular region surrounding the casing and adjacent geologic formations. Such compositions operate under relatively severe conditions, including extremes of temperature and pressure.

Cementitious compositions for oil well applications are maintained in a fluid state during the period in which the composition is pumped. After pumping, the composition begins to set and eventually hardens to a suitable strength. If the setting time is short, the composition hardens rapidly and oil extraction may commence more quickly. Thus, cementitious compositions for oil well applications should generally exhibit low initial viscosity, suitable pumpability, and short setting times once the compositions are in place surrounding the well annulus.

The oil and gas industry has defined standards for various classes of cement used in wellbore applications. The American Petroleum Institute (API) specifies Classes A through H. Class H cement is specified as applicable for more challenging applications involving deep wells (down to 8,000 ft). The performance requirements for oil wells generally preclude the use of relatively inexpensive cementitious compositions commonly used in less demanding applications. These relatively inexpensive cements may include, for example, API Classes A through F cements as well as Types I, II and III cements defined by the American Society for Testing and Materials (ASTM).

SUMMARY

A cementitious composition capable of forming a high, early-phase strength cement may comprise construction grade cement and ground blast furnace slag, the ground blast furnace slag having a Blaine fineness less than about 250 m²/kg. The cementitious composition may comprise, for each 100% by weight, greater than about 50% by weight construction grade portland cement and less than about 50% by weight ground blast furnace slag, and the cementitious composition may have a Blaine fineness less than about 300 m²/kg. Methods of making and using such a cementitious composition to cement a structure are also described.

DETAILED DESCRIPTION OF THE DISCLOSED EMBODIMENTS

As used herein, the following terms should be understood to have the indicated meanings:

When an item is introduced by "a" or "an," it should be understood to mean one or more of that item.

"Comprises" means includes but is not limited to.

"Comprising" means including but not limited to.

"Having" means including but not limited to

"Cement" means any material that increases in strength upon setting and which may or may not be used as a binding substance for other materials.

"Cementitious" means of or relating to a substance having the characteristics of cement.

"Cementitious composition" means a material comprising cement.

"Clinker" means a material comprising one or more hydraulic calcium silicates. Clinker may or may not be sintered into lumps or nodules, typically of a diameter no greater than about 3 inches, or other suitable size.

"GBFS" means ground blast furnace slag. "CSH" means calcium silicate hydrate.

"GBFS-derived CSH" means CSH which is formed through hydration of GBFS.

"Cement-derived CSH" means CSH which is formed through hydration of cement.

"Grinding" means to reduce or lessen into relatively smaller particles or pieces by pulverizing, pounding, cutting, crushing, grating, rubbing harshly, carving, sawing, trimming, or dissolving, or a combination thereof.

"Hydraulic" means able to set by reacting with water.

"Portland cement" means a type of hydraulic cement containing clinker and one or more forms of calcium sulfate. One or more processing additives, in addition to clinker and calcium sulfate, may or may not be present.

"Setting" and "set" mean the solidification and hardening of a cement slurry.

"Early-phase" means the period of setting before a cement slurry reaches a compressive strength of about 500 psi.

"Late-phase" means the period of setting after a cement slurry reaches a compressive strength of about 500 psi.

"Slurry" means a suspension of a solid in a liquid.

"Standardized portland cement" means a hydraulic cement having physical characteristics which satisfy a standardized cement type, such as, for example, the cement types described by the American Society for Testing and Materials in ASTM Specification C150 or those described by the American Association of State Highway and Transportation Officials in AASHTO Specification M85.

"Construction grade cement" means a hydraulic cement that does not meet the specifications of a Class H cement as defined by the American Petroleum Institute (APT) or other standard setting body. Construction grade cements include but are not limited to API Classes A through F as well as Types I, II, and III as defined by the American Society for Testing and Materials (ASTM).

"Displacement fluid" means any fluid used to facilitate the movement of a cement or cementitious product through the casing of an oil or gas wellbore.

"Coarse" means having a Blaine fineness less than about 250 m²/kg.

"Fine" means having a Blaine fineness greater than about 250 m²/kg.

The present application is directed to a cementitious composition exhibiting low initial viscosity and characterized by early-phase strength and high final compressive strength when admixed with water. This application is also directed towards a method of using such a cementitious composition in cementing a structure, such as for example, cementing a wellbore for use in oil or gas drilling and production.

Factors that influence the overall cost of cementitious compositions may include the use of composite cements, the cost of milling or grinding the cement clinker, and the presence of additives. In a cementitious composition, a relatively inexpensive material may be used as a substitute for a fraction of cement in the resulting slurry. A material that may be used in this manner is ground blast furnace slag (GBFS), which may be a by-product of iron and steel production.

In the production of iron and steel, iron ore, limestone and coke ash are heated in a blast furnace to a temperature typically near 1600° C. Blast furnace slag from the top of the resulting molten slurry is removed and cooled in a step commonly referred to as quenching, which may involve directly spraying the blast furnace slag with water. Under these conditions, the slag is characterized by a makeup that is predominantly glassy. GBFS may be substituted for a portion of portland cement in a cementitious composition, resulting in a significant cost savings for the cementitious composition.

Cementitious compositions may be admixed with water or another suitable liquid to form a cement slurry. Setting of the cement slurry involves a series of hydration reactions. A kinetic description of the rate of reactions during setting includes the surface area of the particles within a cementitious composition, the accessibility of water to reactive sites, available thermal energy, and the localized pH or alkalinity at the particle surface. The rate of reactions generally increases when more surface area is available for reaction. Another factor which may influence the rate of reactions associated with setting of a cementitious composition is the relative energy necessary for particles to move past one another. This factor may be dependent upon numerous variables, including the relative size of particles and the state of interlocking hydration products formed during the setting process. The factors described above may depend on thermal activation, and the importance of each in determining the early-phase and late-phase strength of a cementitious composition is likewise temperature dependent.

Upon formation of the cement slurry the hydration of the cementitious composition causes the cement slurry to become alkaline by the reaction between the C3A and water thereby producing heat that supplements thermal energy provided by the external environment. The alkaline and highly energetic environment of the cement slurry supports a number of chemical reactions, such as the early-phase reaction of clinker minerals with water to form aluminate-containing compounds. These compounds further react with free sulfates to form needle-like projections of ettringite $((CaO)_6(Al_2O_3)(SO_3)_3 \cdot 32\ H_2O)$. This compound plays several roles in the early-phase of hardening. First, the formation of ettringite needles is an initial barrier to the relative motion of adjacent particles. Additionally, ettringite acts as a permeation barrier serving to block water from fast reacting tricalcium aluminate $(C_3A)$.

The onset of more significant hardening may be marked by an increasing proportion of hydration products including calcium silicate hydrate (CSH). CSH adds significantly to the strength of the hardening cement and has a lower proportion of CaO than the primary calcium silicates of portland cement clinker. The calcium silicates of portland cement are more commonly known as alite, or tricalcium silicate $(Ca_3 \cdot SiO_5)$, and belite, or dicalcium silicate $(Ca_2SiO_4)$. The excess calcium resulting from the formation of CSH is found in calcium hydroxide, which plays several roles in the setting of cement slurry, including a key role in the activation of GBFS. Calcium hydroxide creates alkaline conditions under which GBFS undergoes hydration reactions. These reactions are typically slower than the hydration reactions in portland cement, and for this reason GBFS is commonly referred to as a latent hydraulic material.

In one embodiment, a cementitious composition may be formed by mixing coarse GBFS with construction grade portland cement. Such a cementitious composition may comprise, for each 100% by weight, greater than about about 50% construction grade portland cement and less than about 50% coarse GBFS. The coarse GBFS in such a cementitious composition may have a Blaine fineness less than about 250 m²/kg, while the cementitious composition as a whole may have a Blaine fineness less than about 300 m²/kg.

A cementitious composition as described herein may be admixed with water or another suitable liquid to form a cement slurry. For example, in one embodiment, a cement slurry may comprise, for each 100% by weight of the cementitious composition, between about 30% and about 50% water. A person having ordinary skill in the art will understand that additional materials may also be added to the cement slurry, including, for example, sand, aggregates, accelerators, retarders, suspending agents, loss-circulation control agents, desiring control agents, and friction reducers.

The cement slurry may have an initial consistency of greater than about 10 Bearden units of consistency ($B_c$), which is a dimensionless quantity used to measure the pumpability of a substance as known by persons of ordinary skill in the art. The thickening time of the cement slurry, or the time required for the cement slurry to reach what is generally considered the maximum pumpable consistency of about 70 $B_c$, generally may be greater than about 2:45 hr:min, measured at 400° F. The viscosity of the cement slurry, measured at 80° F. using a Model 35A Fann Viscometer and a No. 1 spring, may be greater than about 70 cps at 300 RPM.

The compressive strength of the cement slurry may be between about 400 psi and about 600 psi after 6 hours, and between about 2200 psi and about 2800 psi after 24 hours. The testing conditions under which the preceding properties of consistency, thickening time, viscosity, and compressive strength may be measured are described in greater detail below in the cited examples. Of course, other suitable values for those properties may also be employed.

It is believed that the relative surface area and particle size of coarse GBFS plays a significant role in determining the properties of a cementitious composition created from a combination of coarse GBFS with portland cement. A cementitious composition as described herein may contain coarse GBFS, which has a relatively low Blaine fineness and a relatively large particle size. It is believed that coarse GBFS may influence the rate of chemical reactions associated with setting of a cementitious composition.

An initial step in the hydration of GBFS involves cleavage of silica bonds within the GBFS—a step that is both temperature and pH dependent. As cementitious compositions comprising GBFS set, CSH forms from both the GBFS and the cement, and slowly precipitates from solution in a temperature dependent manner. The precipitation of GBFS-derived CSH contributes to the strength of the hardening cement, and this contribution appears to increase as temperature increases. The rate of hydration of cementitious compositions comprising GBFS has been studied by isothermal conduction calorimetry (C. A. Utton et al., Journal of Amer. Cer. Society, Vol. 91 Issue 3, pp 948-953). In this study, the thermal activation of GBFS relative to the thermal activation of cement increased steadily over the temperature range studied between 12° C. to 90° C.

It is believed that at elevated temperatures a greater proportion of early-phase strength is accounted for by GBFS-derived CSH than from cement-derived CSH. It is further believed that the early-phase formation of CSH contributes to macromolecular entanglement of GBFS particles thereby resulting in greater early strength. Larger GBFS particle sizes are also believed to contribute to macromolecular entanglement and greater early-phase strength in cementitious compositions comprising coarse GBFS.

The physical and chemical properties of cementitious compositions comprising coarse GBFS may be well suited to sealing a wellbore used in oil and gas well drilling. In this application, the relative amounts of portland cement and coarse GBFS used will depend upon the desired application and various environmental factors such as, for example, the depth of the wellbore and conditions within the geologic formation. A cement slurry formed from a cementitious composition comprising coarse GBFS may be pumped into a steel casing pipe and directed to the bottom of the wellbore. A displacement fluid may be used to facilitate movement of a cement slurry through the casing, and the cement slurry may be forced through the bottom of the steel casing pipe and into the surrounding annular region between the steel casing pipe and the adjacent geologic formation and allowed to set in order to cement the casing in place with respect to the surrounding geologic formation.

Cementitious compositions as described herein may also be used to cement any other suitable structure in place. For example, a cementitious composition as described herein may be used to form a slurry that may be poured about one or more structural components, such as bars, beams, rods, columns, mesh, or other suitable components made of any desirable materials, such as steel, aluminum, titanium, fiberglass, wood, stone, concrete, or other composites, for example. The slurry may then be allowed to set in order to cement such components in place. Alternatively, such components may be placed into such a slurry after the slurry is in place, and then the slurry may be allowed to set. Such uses may include but are not limited to applications such as roads, sidewalks, bridges, ditches, runways, dams, buildings, water wells, tunnels, canals, retaining walls, landing pads, and other structures.

Embodiments of the invention will be further described in connection with the following examples, which are set forth for purposes of illustration only:

Example 1

A cementitious composition was prepared by mixing portland cement and coarse GBFS. The portland cement was a Class A cement as defined by API specifications. Coarse GBFS used in the cementitious product had the following chemical composition:

TABLE 1

| Chemical Composition (% by Weight) | |
| --- | --- |
| $SiO_2$ | 35% |
| $Al_2O_3$ | 16% |

TABLE 1-continued

| Chemical Composition (% by Weight) | |
| --- | --- |
| CaO | 38% |
| MgO | 6% |
| $Fe_2O_3$ | 0.95% |
| $MnO_2$ | 1.2% |
| $K_2O$ | 0.4% |
| $Na_2O$ | 0.3% |
| S | 1.05% |

The coarse GBFS used in this example may be further characterized as having greater than about 97% glassy phase. The cementitious composition was formed by admixing about 70% portland cement with about 30% coarse GBFS. The portland cement had a Blaine fineness of about 290 $m^2$/kg, while the coarse GBFS had a Blaine fineness of about 139 $m^2$/kg. The resulting cementitious composition had a Blaine fineness of about 242 $m^2$/kg and the following chemical composition:

TABLE 2

| Chemical Composition (% by Weight) | |
| --- | --- |
| $SiO_2$ | 25.48% |
| $Al_2O_3$ | 8.45% |
| $Fe_2O_3$ | 1.57% |
| CaO | 57.38% |
| MgO | 2.74% |
| $K_2O$ | 0.50% |
| $Na_2O$ | 0.18% |
| $SO_3$ | 2.79% |
| LOI | 0.01% |
| $Na_2O$ | 0.51% |

Water was admixed with the dry cementitious composition described above at about 38% by weight of the cementitious composition. The viscosity of the cement slurry was measured at about 80° F. using a Fann Viscometer, which is a rotational type rheometer, and a No. 1 spring. The cement slurry had the following viscosity:

TABLE 3

| Viscosity | |
| --- | --- |
| RPM | cps |
| 300 | 80 |
| 200 | 68 |
| 100 | 55 |
| 6 | 22 |
| 3 | 15 |

To determine the pumpability of the cementitious composition, a cement slurry was prepared according to the procedures outlined in API Schedule 9.2. Water was admixed with the dry cementitious composition described above at about 38% by weight of the cementitious composition. Sand, known to persons having ordinary skill in the art as silica flour, and sold under the trade name SSA-1 (Halliburton, Inc.), was added to the cement slurry along with various processing additives, including a suspending aid, loss-circulation control agents, and a friction reducer. All process additives were sourced from Halliburton, Inc.

The initial cement slurry viscosity in Bearden units of consistency (Bc) was about 20. The cement slurry was then heated to a test temperature of 400° F. and the thickening time, or the time required for the cement slurry to reach what is generally considered the maximum pumpable consistency of about 70 Bc, was measured. The cement slurry reached a consistency of about 70 $B_c$ in about 3:29 hr:min. The strength of the cementitious composition was measured by determining the compressive strength at discrete intervals over a period of about 50 hours, at 400° F. The cement slurry had the following chemical composition and compressive strength:

TABLE 4

A. Chemical Composition

| component | (% by Weight) |
|---|---|
| Cementitious Composition | ~64% |
| SSA-1 (silica flour) | ~35% |
| HALAD 344 (fluid loss additive) | 0.4% |
| HALAD 413 (fluid loss additive) | 0.5% |
| SA-541 (Suspending Aid) | >1% |
| CFR-3 (Friction reducer) | >1% |

B. Compressive Strength

| Time (hr:min) | psi |
|---|---|
| 5:25 | 50 |
| 6:00 | 500 |
| 24:00 | 2506 |
| 48:00 | 2525 |

Example 2

A cementitious composition of Class A portland cement and coarse GBFS was prepared using a procedure similar to that of Example 1, except that the composition comprised about 50% portland cement and about 50% coarse GBFS. The portland cement had a Blaine fineness of about 290 m²/kg, while the coarse GBFS had a Blaine fineness of about 139 m²/kg. The resulting cementitious composition had a Blaine fineness of about 247 m²/kg.

A cement slurry was prepared as described in Example 1, and the cement slurry reached a consistency of about 70 Bc in about 2:09 hr:min. The compressive strength of the cement slurry was measured under the same conditions as Example 1. The chemical composition and compressive strength were as follows:

TABLE 5

A. Chemical Composition

| Component | (% by Weight) |
|---|---|
| Cementitious Composition | ~64% |
| SSA-1 (silica flour) | ~35% |
| HALAD 344 (fluid loss additive) | 0.4% |
| HALAD 413 (fluid loss additive) | 0.5% |
| SA-541 (Suspending Aid) | >1% |
| CFR-3 (Friction reducer) | >1% |

B. Compressive Strength

| Time (hr:min) | psi |
|---|---|
| 2:30 | 50 |
| 2:45 | 500 |
| 24:00 | 1711 |

Reference Samples

Several reference samples were prepared for purposes of comparison. In the first reference sample, a cementitious composition of Class A portland cement and GBFS was made using a procedure similar to that of Example 1, except that the composition comprised about 90% portland cement and about 10% fine GBFS (the 90-10 Sample), wherein the GBFS had a Blaine fineness of about 480 m²/kg. Two additional reference samples were also prepared using the same Class A Portland cement and fine GBFS components, one sample comprised about 50% portland cement and about 50% fine GBFS (the 50-50 Sample), and the other sample comprised about 33% portland cement and about 67% fine GBFS (the 33-67 Sample). The three reference samples had the following chemical composition and Blaine fineness:

TABLE 6

|  | 90-10 Sample | 50-50 Sample | 33-47 Sample |
|---|---|---|---|
| A. Chemical Composition % by Weight | | | |
| $SiO_2$ | 22.69% | 28.31% | 30.18% |
| $Al_2O_3$ | 6.25% | 10.62% | 12.3% |
| $Fe_2O_3$ | 1.75% | 1.39% | 1.23% |
| CaO | 63.22% | 51.99% | 48.01% |
| MgO | 1.79% | 3.38% | 4.41% |
| $K_2O$ | 0.53% | 0.47% | 0.44% |
| $Na_2O$ | 0.14% | 0.21% | 0.24% |
| $SO_3$ | 2.84% | 2.74% | 2.68% |
| LOI | 0.02% | 0.01% | 0.01% |
| $Na_2O$ | 0.49% | 0.52% | 0.53% |
| B. Blaine Fineness (m²/kg) | | | |
| Class A | 290 | 290 | 290 |
| GBFS | 480 | 480 | 480 |
| Cementitious Composition | 311 | 358 | 421 |

A cement slurry was prepared as described in Example 1 for each of the reference samples, and the thickening time was measured for each. The slurries prepared with the 90-10 Sample, the 50-50 Sample, and the 33-67 Sample had thickening times of about 3:37 hr:min, about 5:02 hr:min, and about 5:25 hr:min, respectively. The viscosity and compressive strengths of the cement slurries were measured according to the procedures described in Example 1 and were as follows:

TABLE 7

A. Viscosity

| 90-10 Sample | | 50-50 Sample | | 33-67 Sample | |
|---|---|---|---|---|---|
| RPM | cps | RPM | cps | RPM | cps |
| 300 | 130 | 300 | 230 | 300 | >300 |
| 200 | 105 | 200 | 185 | 200 | 292 |
| 100 | 88 | 100 | 142 | 100 | 140 |
| 6 | 30 | 6 | 35 | 6 | 60 |
| 3 | 18 | 3 | 22 | 3 | 32 |

B. Compressive Strength

| 90-10 Sample | | 50-50 Sample | | 33-67 Sample | |
|---|---|---|---|---|---|
| Tim (hr:min) | (psi) | Tim (hr:min) | (psi) | Tim (hr:min) | (psi) |
| 8:01 | 50 | 9:46 | 50 | 9:21 | 50 |
| 9:26 | 500 | 10:46 | 500 | 10:07 | 500 |
| 24:00 | 1159 | 24:00 | 1923 | 24:00 | 2590 |
| 48:00 | 1100 | 48:00 | 2105 | 48:00 | 2514 |

A fourth reference sample was created which comprised a Class H cement, as described in API Spec 10A, without any GBFS. The Class H cement reference sample had a Blaine fineness of about 240 m²/kg. The compressive strength of a cement slurry comprising the Class H cement was measured under the same conditions as Example 1, and was as follows:

TABLE 8

Compressive Strength

| Time (hr:min) | psi |
|---|---|
| 4:59 | 50 |
| 6:12 | 500 |
| 24:00 | 1078 |

Discussion

Due to the use of coarse GBFS, the Blaine fineness of Example 1 is less than the Blain fineness of the 90-10 Sample, the 50-50 Sample, and the 33-67 Sample. This difference in fineness is also depicted by the particle size distribution plots for these cementitious compositions, which appear in FIG. 1. The addition of coarse GBFS in Example 1 results in a larger particle size for this composition. The data of FIG. 1 can also be characterized by the diameter of particles included within a selected fraction of the cementitious composition as follows:

TABLE 9

Particle Size Distribution

| | d(0.1) µm | d(0.5) µm | d(0.9) µm |
|---|---|---|---|
| Example 1 | 4.9 | 28.7 | 261.0 |
| 90-10 Sample | 3.4 | 17.4 | 60.5 |
| 50-50 Sample | 2.8 | 12.5 | 45.1 |
| 33-67 Sample | 2.4 | 11.5 | 41.7 |

Figure 1:
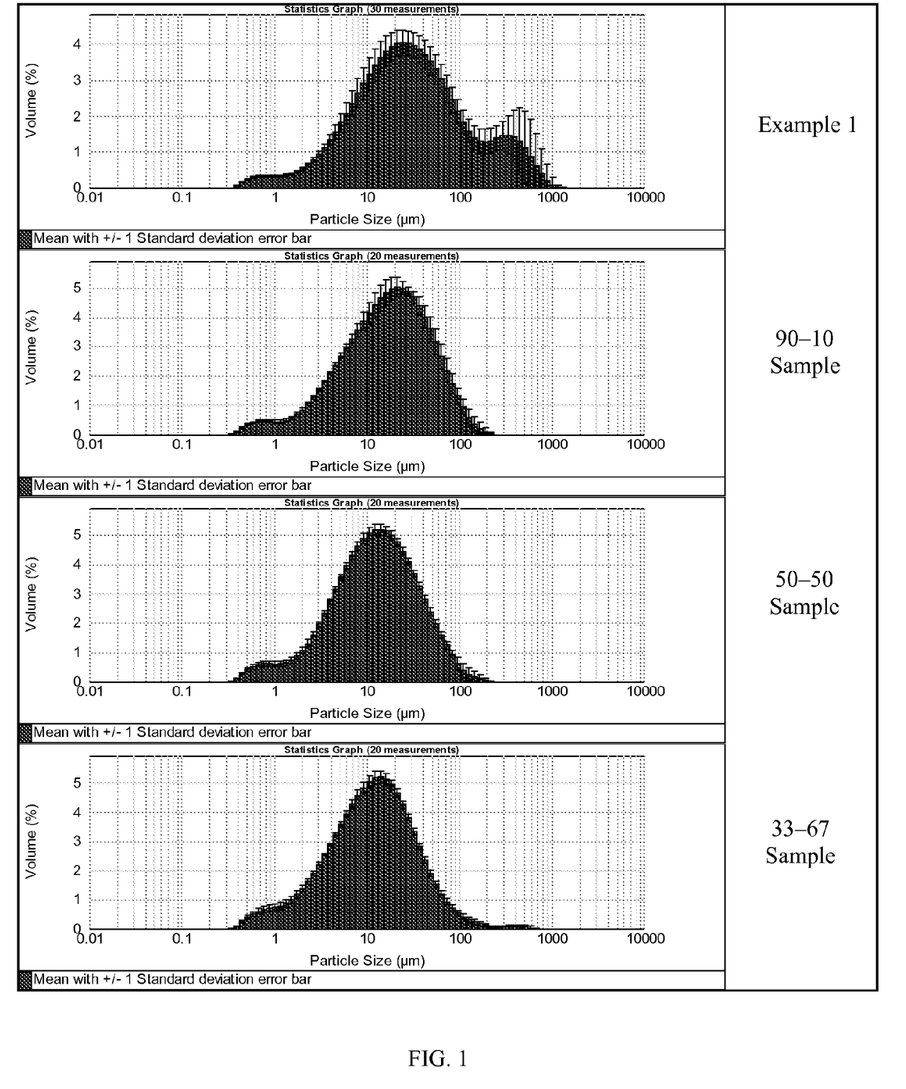
FIG. 1 is a series of graphs depicting particle size distributions for various cementitious compositions.

In Table 9, the d(0.1) measurement represents the diameter of the largest particle size included in the first 10% fraction of the cementitious composition. Similarly, the d(0.5) measurement represents the diameter of the largest particle size included in the first 50% fraction of the cementitious composition, also known as the mean particle size. It should be noted that the particle size at each selected fraction of Example 1 is larger than the particle size at the same selected fraction in the reference samples. This difference is particularly pronounced at the d(0.9) measurement, in which the largest particle size of Example 1 is 261.0 µm. This value is more than four times the largest particle size of any reference sample at the same selected fraction.

This difference in fineness and particle size appears to have a substantial effect on various physical properties of cementitious compositions. For example, Example 1 exhibits lower viscosity and therefore less pumping friction than the 90-10 Sample, the 50-50 Sample, and the 33-67 Sample. It is believed that lower pumping friction and lower viscosity increases the ability of a slurry to effectively fill voids within a well bore or other structure that needs to be cemented. Additionally, the thickening times for Example 1 (3:29 hr:min) and Example 2 (2:09 hr:min) were less than the thickening times of the 90-10 Sample (3:37 hr:min), the 50-50 Sample (5:02 hr:min), and the 33-67 Sample (5:25 hr:min). Shorter thickening times may allow wellbores and other structures to be serviced more quickly, thereby reducing overall cementing costs.

Figure 2:
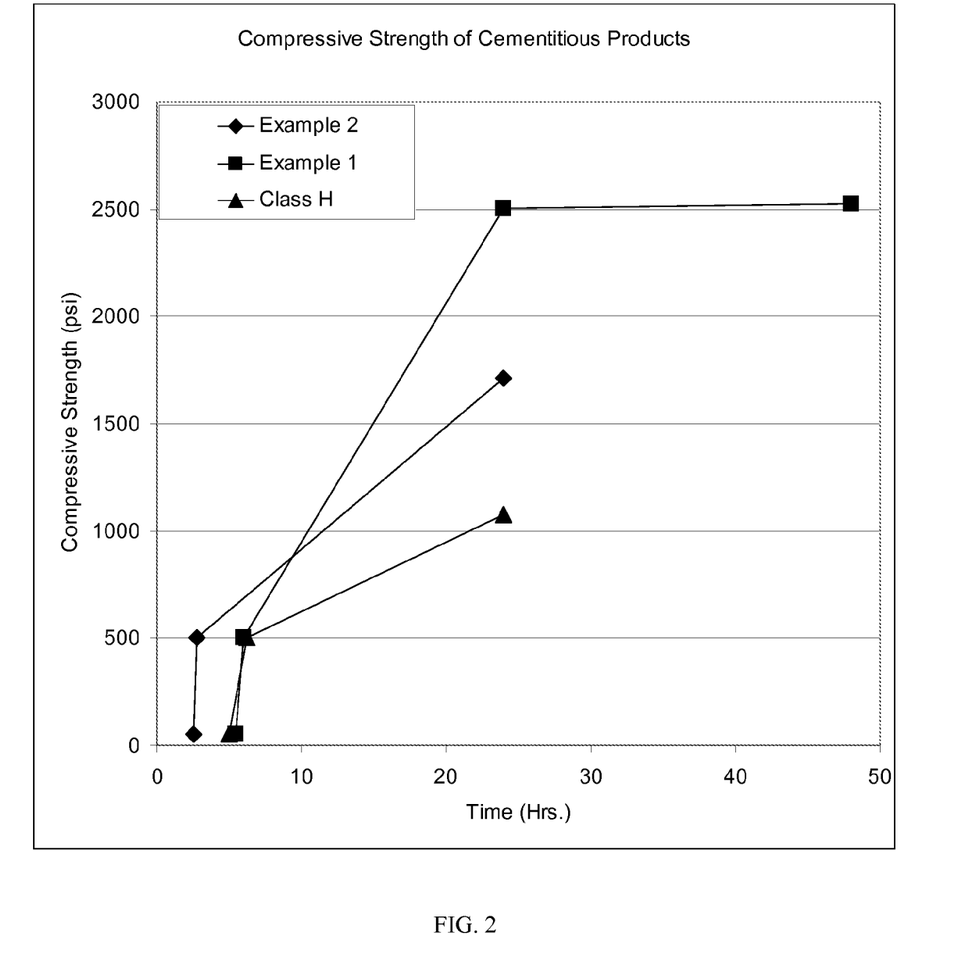
FIG. 2 is a graph depicting plots of compressive strength versus setting time for a cementitious composition containing coarse slag and a Class H cement.

FIG. 2 depicts the compressive strength of Example 1 and Example 2 over time as compared to a Class H reference cement. The early-phase compressive strength of Example 1 appears to be about the same as the early-phase compressive strength of Class H cement. However, over time, the compressive strength of Example 1 greatly exceeds the compressive strength of Class H cement. This result suggests that the cementitious composition of Example 1 matches or exceeds the performance characteristics of Class H cement with respect to compressive strength, yet costs significantly less than Class H cement. The early-phase compressive strength of Example 2 is greater than that of Example 1 or Class H cement, while the late-phase compressive strength of Example 2 is greater than that of Class H cement but less than that of Example 1. This result suggests that the cementitious composition of Example 2 may be used in applications where a shorter thickening time is desired.

Figure 3:
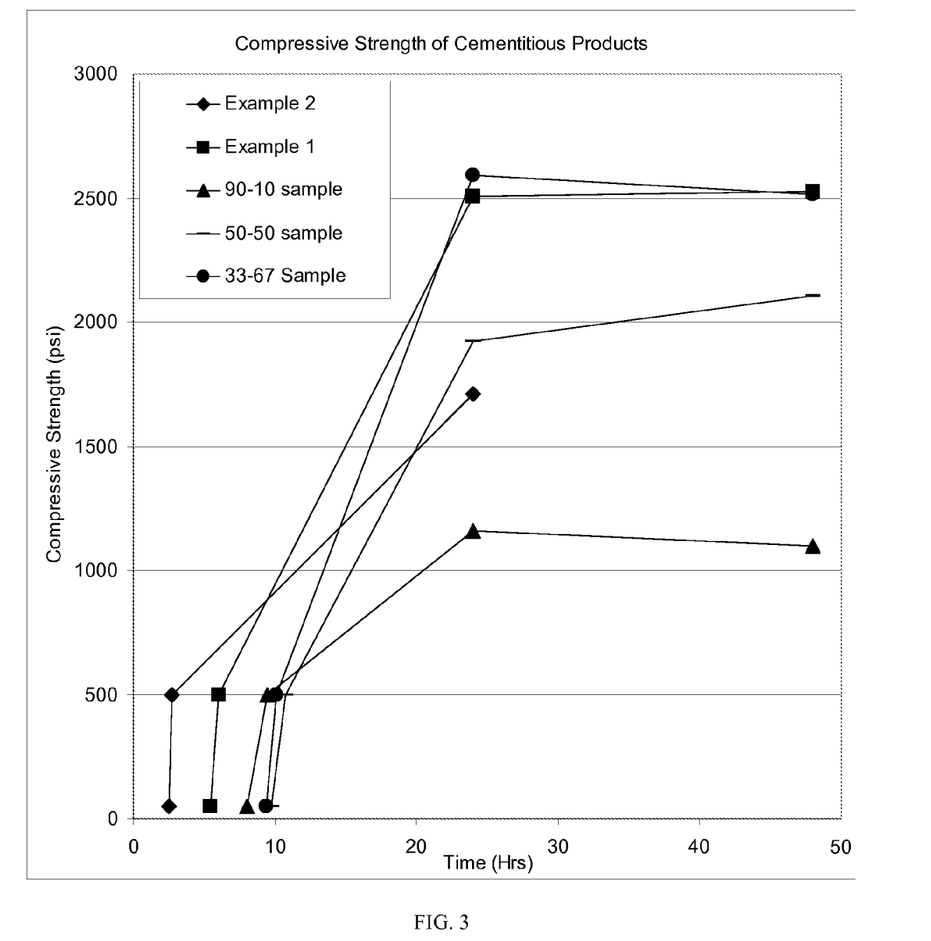
FIG. 3 is a graph depicting plots of compressive strength versus setting time for various cementitious compositions.
Figure 4:
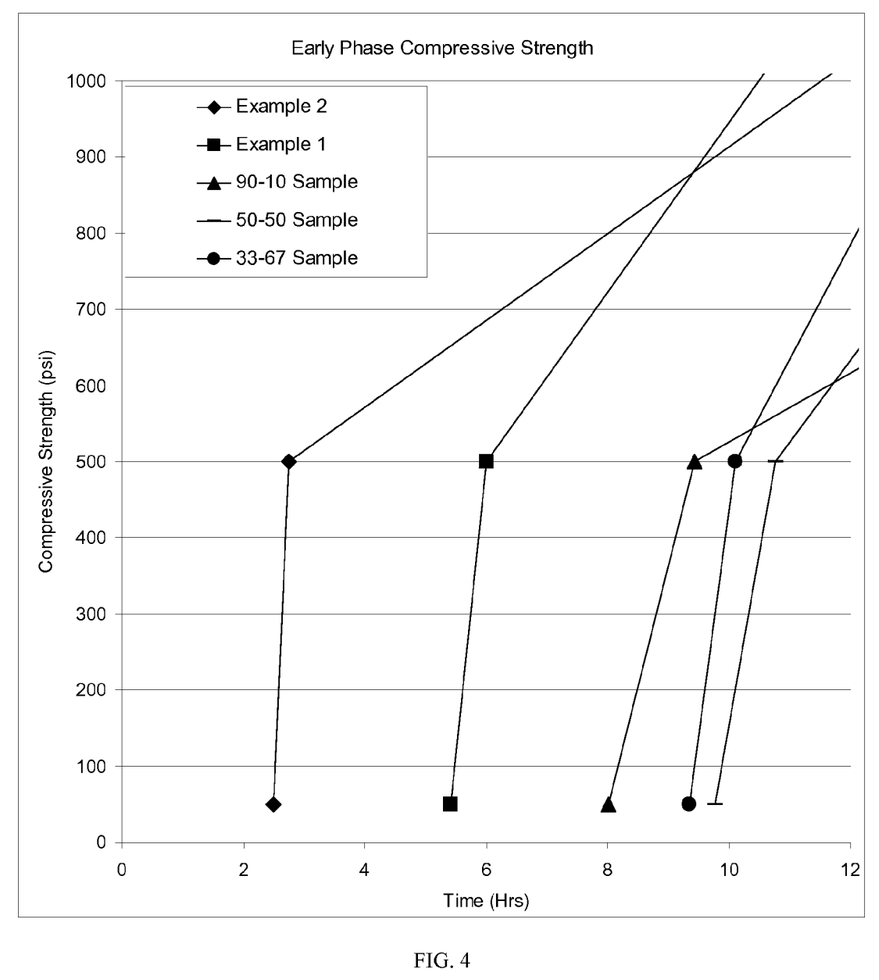
FIG. 4 is a graph depicting plots of compressive strength versus setting time for the early-phase portion of FIG. 3.

FIG. 3 depicts the compressive strength of Example 1 and Example 2 over time as compared to the 90-10 Sample, the 50-50 Sample, and the 33-67 Sample. At nearly every point, the compressive strength of Example 1 exceeds the compressive strengths exhibited by the reference samples. This effect appears to be especially pronounced during the early-phase period. The compressive strength of Example 2 is also significantly greater than that of the reference samples in the early-phase period. However, the late-phase compressive strength of Example 2 levels off at an intermediate value between the 90-10 Sample and the 50-50 Sample. FIG. 4 depicts the same compressive strength data of FIG. 3 but focuses only on the early-phase period. The compressive strengths of both Example 1 and Example 2 greatly exceed the compressive strengths of the reference samples in the early-phase periods, suggesting that cementitious compositions comprising coarse GBFS harden and provide strength much more rapidly than compositions comprising fine GBFS.

What is claimed is:

1. A cementitious composition comprising:
   construction grade cement; and
   ground blast furnace slag;
   wherein said ground blast furnace slag has a Blaine fineness less than about 250 m$^2$/kg.

2. The cementitious composition of claim 1 wherein said composition comprises:
   greater than about 50% by weight construction grade cement; and
   less than about 50% by weight ground blast furnace slag.

3. The cementitious composition of claim 2 wherein said composition comprises:
   between about 50% and about 70% by weight construction grade cement; and
   between about 30% and about 50% by weight ground blast furnace slag.

4. The cementitious composition of claim 2 wherein said composition comprises:
   about 70% by weight construction grade cement; and
   about 30% by weight ground blast furnace slag.

5. The cementitious composition of claim 1 wherein said composition comprises:
   about 50% by weight construction grade cement; and
   about 50% by weight ground blast furnace slag.

6. A method of making a slurry comprising:
   preparing a cementitious composition comprising construction grade cement and ground blast furnace slag, wherein said ground blast furnace slag has a Blaine fineness less than about 250 m$^2$/kg; and
   mixing water with said cementitious composition to form a slurry.

7. A method of cementing a structure comprising:
   forming a slurry by mixing a cementitious composition with water, said cementitious composition comprising construction grade cement and ground blast furnace slag, said ground blast furnace slag having a Blaine fineness less than about 250 m²/kg;

placing said slurry adjacent to said structure; and allowing said slurry to set.

8. The method of claim 7 wherein said structure comprises a wellbore.

9. The method of claim 7 wherein said placing comprises pumping said slurry through a casing pipe and into an annular region between said casing pipe and an adjacent geological formation.

* * * * *

UNITED STATES PATENT AND TRADEMARK OFFICE
CERTIFICATE OF CORRECTION

| | |
|---|---|
| PATENT NO. | : 8,056,631 B2 |
| APPLICATION NO. | : 12/357256 |
| DATED | : November 15, 2011 |
| INVENTOR(S) | : Jose Garcia et al. |

It is certified that error appears in the above-identified patent and that said Letters Patent is hereby corrected as shown below:

IN THE SPECIFICATIONS:

In column 2, line 58, "(APT)" should read --(API)--.

In column 4, line 30, "desiring" should read --deairing--.

In column 7, line 4, "$70B_c$" should read --70Bc--.

Signed and Sealed this
Twentieth Day of December, 2011

David J. Kappos
*Director of the United States Patent and Trademark Office*